June 18, 1957
A. MATHIAS
2,795,982
WIRE STRIPPING TOOL
Filed April 28, 1955
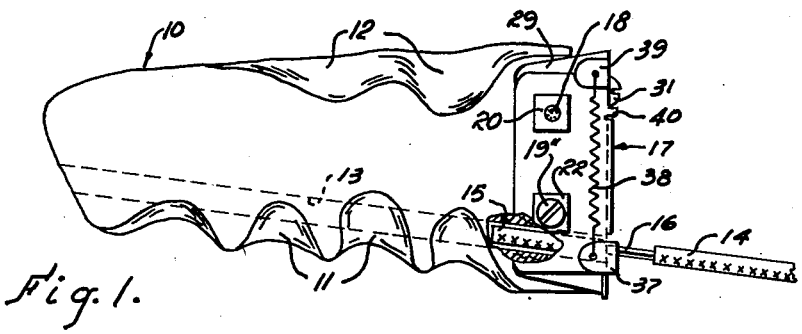
Fig. 1.
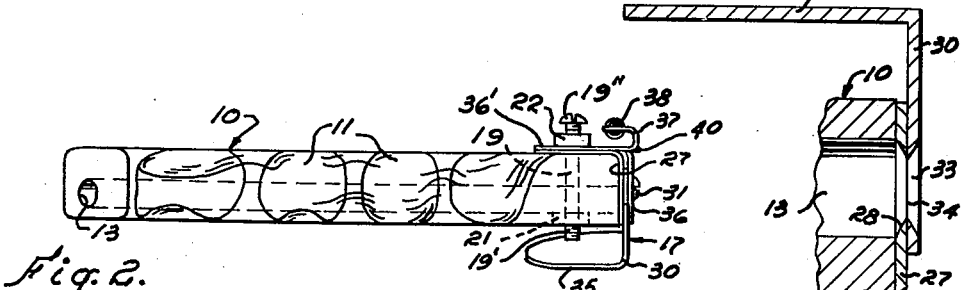
Fig. 2.
Fig. 5.
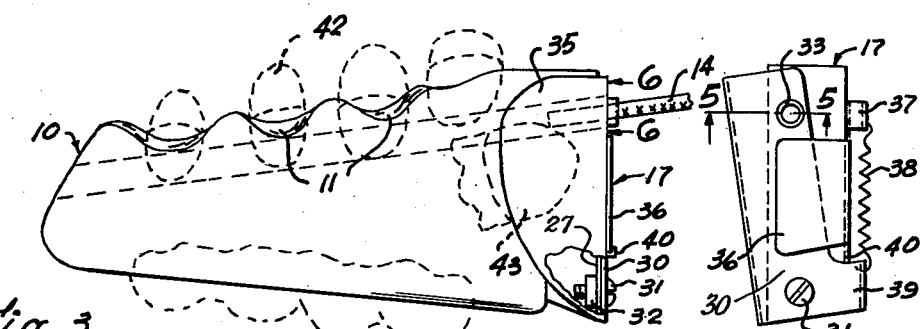
Fig. 3.
Fig. 4.
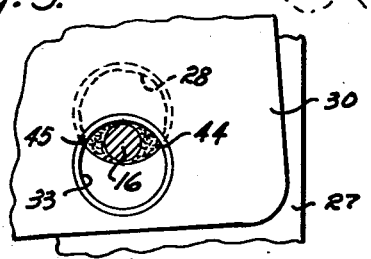
Fig. 6.
INVENTOR.
ARNOLD MATHIAS
BY
L. S. Saulsbury
ATTORNEY

United States Patent Office 2,795,982
Patented June 18, 1957

2,795,982

WIRE STRIPPING TOOL

Arnold Mathias, New Rochelle, N. Y.

Application April 28, 1955, Serial No. 504,559

7 Claims. (Cl. 81—9.5)

This invention relates to a wire stripping tool or gun for removing insulation from insulated cables or wire.

It is the principal object of the invention to provide an inexpensive and effective cable stripping tool for removing the insulation from insulated cables.

It is another object of the invention to provide a wire stripping tool in which the gripping edges are adapted for all sizes of cable and insulation.

It is still another object of the invention to provide a wire stripping tool in which the pressure upon the cable can be kept constant while the pulling action is effected and wherein the squeezing pressure of the hand during the pulling action is divorced from the pressure effected upon the cable by the wire receiving openings and that may be applied by the thumb so that the operator can sense the amount of pressure for the different kinds of wires and insulations whereby there is little chance of rupture of the wire strands.

Other objects of the invention are to provide a wire stripping tool which is of simple construction, has a minimum number of parts, easy to operate, compact, durable, of pleasing appearance, adapted for use by the ordinary house-holder and efficient in operation.

For other objects and a better understanding of the invention, reference may be had to the following detailed description taken in connection with the accompanying drawing, in which:

Figure 1 is a bottom plan view of the wire stripping tool or gun embodying the features of the present invention with a portion broken away to show the wire or cable extended thereinto and partly stripped from its end;

Fig. 2 is a side elevational view of the gun with the press lever lying on the underside;

Fig. 3 is a top plan view of the wire stripping gun with illustration made as to the position of the hand and thumb thereon when effecting a stripping operation;

Fig. 4 is an end elevational view of the tool looking upon the operating parts thereon and with the press lever released;

Fig. 5 is an enlarged fragmentary sectional view taken through the compressing grip openings with the openings aligned with one another as viewed on line 5—5 of Fig. 4; and Fig. 6 is an enlarged fragmentary end view of the operating parts taken in the direction of the arrows 6—6 of Fig. 3 with an insulated wire or cable shown in section and the insulation thereof squeezed to effect a gripping action upon the insulation and to thin the outer edges thereof to start the breakaway action of the insulation.

Referring now to the figures, 10 represents a handle formed of wood or plastic in the shape of a gun handle and having finger and palm grip recesses 11 and 12 on the opposite sides thereof. Extending through the handle is an elongated hole 13 for receiving the end of the insulated wire cable 14 to be stripped of a piece 15 of its insulation to bare wire center 16. The opening 13 is of larger diameter that the cable and serves to cause the cable to be kept straight while effecting the stripping of the insulation therefrom.

The piece 15 of the insulation, when free of the wire center 16, can slide downwardly through the elongated opening 13 and be discharged from the handle.

On the upper end of the handle a stripping device indicated generally at 17 is secured thereto by fastening bolts 18 and 19. The bolt 18 extends from the top side through the handle material and through the bottom side of the device and is made secure by a nut 20 that fixes the stripping device 17 to the end of the handle. The bolt 19, on the other hand, extends from the bottom side, as viewed in Fig. 1, through the device 17 and end of the handle in which it is threaded. This bolt 19 is adjustable in the end of the handle and is threaded in a nut 21 embedded in the surface of the handle, Fig. 2. This bolt 19 extends beyond the nut 21 to provide an adjustable stop projection 19' for a purpose to be later described. The bolt 19 has a head 19" that extends above the device 17. A lock nut 22 is provided below the head to lock the bolt 19 and further secure the device to the bottom surface of the handle. To adjust the bolt 19, the nut 22 is loosened. When the adjustment has been made, nut 22 is again tightened to finally fix the device 17 in place on the handle.

The stripping device 17 consists generally of three sheet metal parts. A part 27 having a round countersunk opening 28 aligned with the opening 13 of the handle, is secured to the handle by its bottom flange 29 that runs along the bottom face of the handle. A cooperating movable part or press lever 30 is pivotally connected to the part 27 by means of a bolt 31 and nut 32. This part 30 has a round countersunk opening 33 of the same size as the opening 28 of the fixed part 27, but countersunk in the opposite direction and from the front face inwardly so as to provide cooperating edges of the parts as indicated at 34 to grip the insulation in the manner as shown in Fig. 6 when the part 30 is hinged upon the part 27 and the pressure applied to squeeze and distort the insulation in the manner as shown in Fig. 6. A thumb press formation 35 extends over the top side of the handle and when depressed the cable is squeezed. The movable part 30 is pivoted upon the bolt 31. Its movement to squeeze the cable is limited by the engagement of the part 30 with adjustable stop projection 19', so as to prevent shearing of the cable center 16. The openings 28 and 33 are oversize for the cable and provide for a wide curved edge that engages the cable insulation.

In order to hold and guide the part 30 against outward displacement, a guide plate 36 extends over the movable part 30 and is fixed by its horizontal portion 36', Fig. 2, over the portion 29 of the inner part 27. The guide plate is fixed to the handle by the bolts 18 and 19.

This guide plate 36 has a downwardly and laterally bent projection 37 to which one end of a return spring 38 is attached. The depressible part 30 has an upwardly and laterally extending projection 39 to which the other end of the spring 38 is attached, Fig. 4. This spring 38 will urge the movable part outwardly so that the openings 28 and 33 are in alignment and the projection 39 will engage a projection 40 on the guide plate portion 36'.

To use the stripping tool the cable is extended through the openings 33 and 28, and the handle is grasped by the hand with the top side up as illustrated at 42 in Fig. 3, and with a thumb 43 upon the press plate 35. The thumb is depressed to squeeze the insulation in the manner shown in Fig. 6 so as to effect a bite upon the same and to weaken the edges of the said insulation so that with a pull of the handle the insulation piece 15 will be separated and pulled or stripped from the cable center 16. It will be noted that as the cutting edges 34 are brought together upon the cable, the insulation is squeezed and deformed to provide thin side edges as indicated at 44 and 45 that are conditioned for easy rupture or tearing as the longitudinal force is applied upon the handle to effect the stripping action. With the openings so shaped and coming together to provide an opening resembling an ellipse in shape, the need for cutting to be made upon the insulation is eliminated, as is effected with the conventional type of fixed size cutters that do not squeeze or squash the insulation but merely cut the same about the wire center. This device may take a number of different sizes of wire without adjustment. A constant amount of pressure is applied by the thumb and need not be varied as the pulling action is effected, and accordingly the wire center will not be sheared. The edges of the opening, while thin, are not designed to effect a cutting action upon the insulation, or wire center, but are merely designed to effectively squeeze and grip the insulation so that a tearing or separating of the insulation piece 15 from the main body of the insulation may be effected. By having the control of the squeezing action separate from the pulling of the handle and effected with the thumb, there is little chance of the cable center being severed.

It should be apparent that there has now been provided an effective and inexpensive tool or wire stripping gun that can be used without skill and by the ordinary householder. With little effort and labor, the cable is relieved of the piece of insulation. It is merely necessary to insert the cable through the openings and into the handle, press the lever and squeeze, and pull on the handle while pressing with the thumb and holding the main part of the cable, all in a simple and effective manner.

While various changes may be made in the detail construction, it shall be understood that such changes shall be within the spirit and scope of the present invention as defined by the appended claims.

What is claimed is:

1. A wire or cable insulation stripping tool comprising a handle, a cable squeezing device mounted on said handle, said device comprising operating parts pivotally connected to each other, said parts having rounded edge openings therein of larger diameter than the diameter of the wire or cable insulation to be stripped and adapted to be axially registered with one another so that a wire can be inserted through the openings, means for pivoting the one part relative to the other part whereby said wire or cable insulation will be squeezed and gripped, said operating parts lying in parallel planes and directly superimposed in flush engagement upon one another and the edges of the openings cooperating with one another to compress the insulation so as to thin the sides thereof and weaken them for tearing action.

2. A wire or cable insulation stripping tool as defined in claim 1, and said handle having an elongated opening extending therethrough and adapted to receive the end of the cable when extended through the openings of the operating parts so as to maintain the cable straight and uncurled while effecting upon the same the stripping of insulation thereof and in which the severed insulation pieces can be collected.

3. A wire stripping tool as defined in claim 1, and said means for pivoting said movable part being a press plate extending over the top of the handle and adapted to be engaged by the thumb of the hand, while gripping the handle with the fingers so that an independent control of the squeezing action upon the cable may be effected by the thumb, while the pulling action is effected with the hand.

4. A wire or cable insulation stripping tool as defined in claim 1, and return spring means for normally urging the movable part so that its opening is placed in alignment with the opening of the other part, stop means extending between the operating parts to limit the movement of the movable part and hold the same under the action of the the spring means with the openings in register with one another.

5. A wire or cable insulation stripping tool as defined in claim 1 and adjustable stop means on the handle and engageable by the movable operating part to limit the pressing movement of the movable part and the squeezing action upon the insulated cable.

6. A wire or cable insulation stripping tool as defined in claim 1, and said operating parts extending transversely across the end of the handle, guide means extending from the one part over the movable part to hold the movable part in parallel flush superimposed engagement with the one part, while the pulling action is being effected upon the cable with the tool.

7. A wire or cable insulation stripping tool comprising a handle, a stripping part fixed to one end of the handle, a movable stripping part pivotally connected to the fixed stripping part in parallel superimposed flush engagement therewith, said parts respectively having countersunk openings thereon, said openings adapted to be aligned with one another to receive an insulated cable, said handle having an opening extending longitudinally therethrough and in alignment with the openings of the fixed and movable parts, a press level portion on the movable part extending partially over the end of the handle and adapted to be engaged by the thumb of the hand while the fingers are extended about the handle to effect a pulling operation upon the handle, a guide plate extending from the fixed part over the movable part to hold the movable part in parallel superimposed flush engagement with the fixed part as the stripping action is being effected, stop means for holding the parts so that the openings thereof are aligned with one another, spring biasing means normally urging the movable part into a position so that its opening is in alignment with the opening of the fixed part, and adjustable stop means for limiting the pressing movement of the press lever portion.

References Cited in the file of this patent

UNITED STATES PATENTS

| | | |
|---|---|---|
| 1,314,759 | Silvernail | Sept. 2, 1919 |
| 1,977,677 | Hill | Oct. 23, 1934 |

FOREIGN PATENTS

| | | |
|---|---|---|
| 461,808 | Canada | Dec. 20, 1949 |